US009861997B2

(12) United States Patent
Bogle

(10) Patent No.: US 9,861,997 B2
(45) Date of Patent: Jan. 9, 2018

(54) BULK-PRODUCT CONVEYOR WITH FLUID INJECTORS

(71) Applicant: Laitram, L.L.C., Harahan, LA (US)

(72) Inventor: David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 129 days.

(21) Appl. No.: 14/401,864

(22) PCT Filed: Jun. 12, 2013

(86) PCT No.: PCT/US2013/045415
§ 371 (c)(1),
(2) Date: Nov. 18, 2014

(87) PCT Pub. No.: WO2014/004091
PCT Pub. Date: Jan. 3, 2014

(65) Prior Publication Data
US 2015/0140223 A1    May 21, 2015

Related U.S. Application Data

(60) Provisional application No. 61/664,442, filed on Jun. 26, 2012.

(51) Int. Cl.
| F26B 3/00 | (2006.01) |
| F26B 17/04 | (2006.01) |
| B05B 13/02 | (2006.01) |
| F26B 3/20 | (2006.01) |
| B65G 17/08 | (2006.01) |

(Continued)

(52) U.S. Cl.
CPC ........ *B05B 13/025* (2013.01); *B05B 13/0278* (2013.01); *B05D 1/02* (2013.01); *B65G 17/08* (2013.01); *B65G 49/00* (2013.01); *F26B 3/20* (2013.01); *F26B 17/04* (2013.01); *F26B 17/045* (2013.01); *B65G 2201/04* (2013.01); *B65G 2207/30* (2013.01)

(58) Field of Classification Search
CPC ........... F26B 3/20; F26B 17/045; F26B 17/04
USPC ......... 99/477, 478, 479, 443 C; 34/500, 502, 34/236
See application file for complete search history.

(56) References Cited

U.S. PATENT DOCUMENTS 456,732 A * 7/1891 Mey .......................... F26B 3/20
34/203
3,161,485 A * 12/1964 Buhrer ...................... B22C 5/08
164/5

(Continued)

FOREIGN PATENT DOCUMENTS

DE    3001531 A1    7/1981
GB    2263617 A     8/1993
(Continued)

OTHER PUBLICATIONS

Extended European Search Report, European Patent Application No. 13809271.3, EPO, dated Mar. 24, 2016.

*Primary Examiner* — Reginald L Alexander
(74) *Attorney, Agent, or Firm* — James T. Cronvich

(57) ABSTRACT

A belt conveyor including a conveyor belt that has hollow injectors for injecting a process fluid into a conveyed layer of bulk products and a method for injecting a process fluid into a layer of bulk products conveyed on a conveyor belt.

25 Claims, 4 Drawing Sheets

(51) Int. Cl.
 *B05D 1/02* (2006.01)
 *B65G 49/00* (2006.01)

(56) References Cited

U.S. PATENT DOCUMENTS

| | | | | |
|---|---|---|---|---|
| 3,774,752 | A | * | 11/1973 | Harvey ................. B65G 17/06 |
| | | | | 198/852 |
| 4,350,027 | A | | 9/1982 | Tyree, Jr. |
| 4,991,315 | A | * | 2/1991 | Falck ................. F27D 15/0266 |
| | | | | 34/217 |
| 5,460,015 | A | | 10/1995 | Venetucci |
| 5,651,191 | A | * | 7/1997 | Walunas ............... F26B 15/143 |
| | | | | 198/952 |
| 6,318,544 | B1 | | 11/2001 | O'Connor et al. |
| 6,467,610 | B1 | | 10/2002 | MacLachlan |
| 8,397,904 | B2 | | 3/2013 | Bogle |
| 2007/0222612 | A1 | | 9/2007 | Krisl |
| 2008/0223695 | A1 | | 9/2008 | Pedersen |
| 2008/0263888 | A1 | * | 10/2008 | von Wedel ........... B65G 25/065 |
| | | | | 34/236 |
| 2011/0232239 | A1 | | 9/2011 | Winter et al. |
| 2011/0265492 | A1 | | 11/2011 | Newman et al. |
| 2013/0146672 | A1 | | 6/2013 | DePaso |
| 2014/0158497 | A1 | | 6/2014 | Bogle |

FOREIGN PATENT DOCUMENTS

| | | |
|---|---|---|
| JP | 08-067326 A | 3/1996 |
| JP | 10-318640 A | 12/1998 |
| JP | 2003137424 A | 5/2003 |
| JP | 2004-313827 A | 11/2004 |

* cited by examiner

BULK-PRODUCT CONVEYOR WITH FLUID INJECTORS

BACKGROUND

The invention relates generally to power-driven conveyors and more particularly to belt conveyors having injectors injecting a process fluid into a layer of conveyed bulk products.

Conveyor belts are used to convey bulk food products, such as corn and peas, through processing devices, such as blanchers, cookers, chillers, and freezers. The products rest on the conveyor belt's outer conveying surface in a mass. It is often important that the processing device process the product mass uniformly through its depth or that all products undergo at least a minimum level of processing. For example, a cooking process may require that the temperature at any point in the product mass reach a minimum level. In the case of a bed of product on a conveyor belt advancing through a cooker, products somewhere in the middle of the bed's depth are at a cold spot where the temperature reaches the minimum temperature level last. One way to ensure that the products at the cold spot of the bed are adequately heated is to overheat the products. But that wastes energy and affects the quality of the products by overcooking those outside the cold spot.

Thus, there is a need to improve the quality of bulk products conveyed through a processing device.

SUMMARY

This need and other needs are addressed by a conveyor embodying features of the invention. One version of such a conveyor comprises a conveyor belt having a bottom side and an opposite outer conveying surface supporting a layer of bulk products. The conveyor belt advances the layer of bulk products in a direction of belt travel. Hollow injectors extend outward of the outer conveying surface into the layer of bulk products. The hollow injectors include interior fluid channels that have output ports opening into the layer of bulk products and input ports. A source of process fluid is in fluid communication with the input port to supply the process fluid through the fluid channels of the hollow injectors and the output ports and into the layer of bulk products.

In another aspect of the invention, a conveyor belt comprises a bottom side and an opposite outer conveying surface for supporting a layer of bulk products. Hollow injectors extend outward from the outer conveying surface. The hollow injectors include interior fluid channels having output ports opening from the hollow injectors outward of the outer conveying surface and input ports.

In yet another aspect of the invention, a method for injecting a process fluid into a layer of bulk products conveyed on a conveyor belt comprises: (a) conveying a layer of bulk products atop the outer conveying surface of a conveyor belt advancing in a direction of belt travel; (b) advancing with the conveyor belt a plurality hollow injectors having input ports in fluid communication with output ports positioned within the layer of bulk products; and (c) supplying a process fluid into the input ports and out through the output ports of the hollow injectors into the layer of bulk products.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
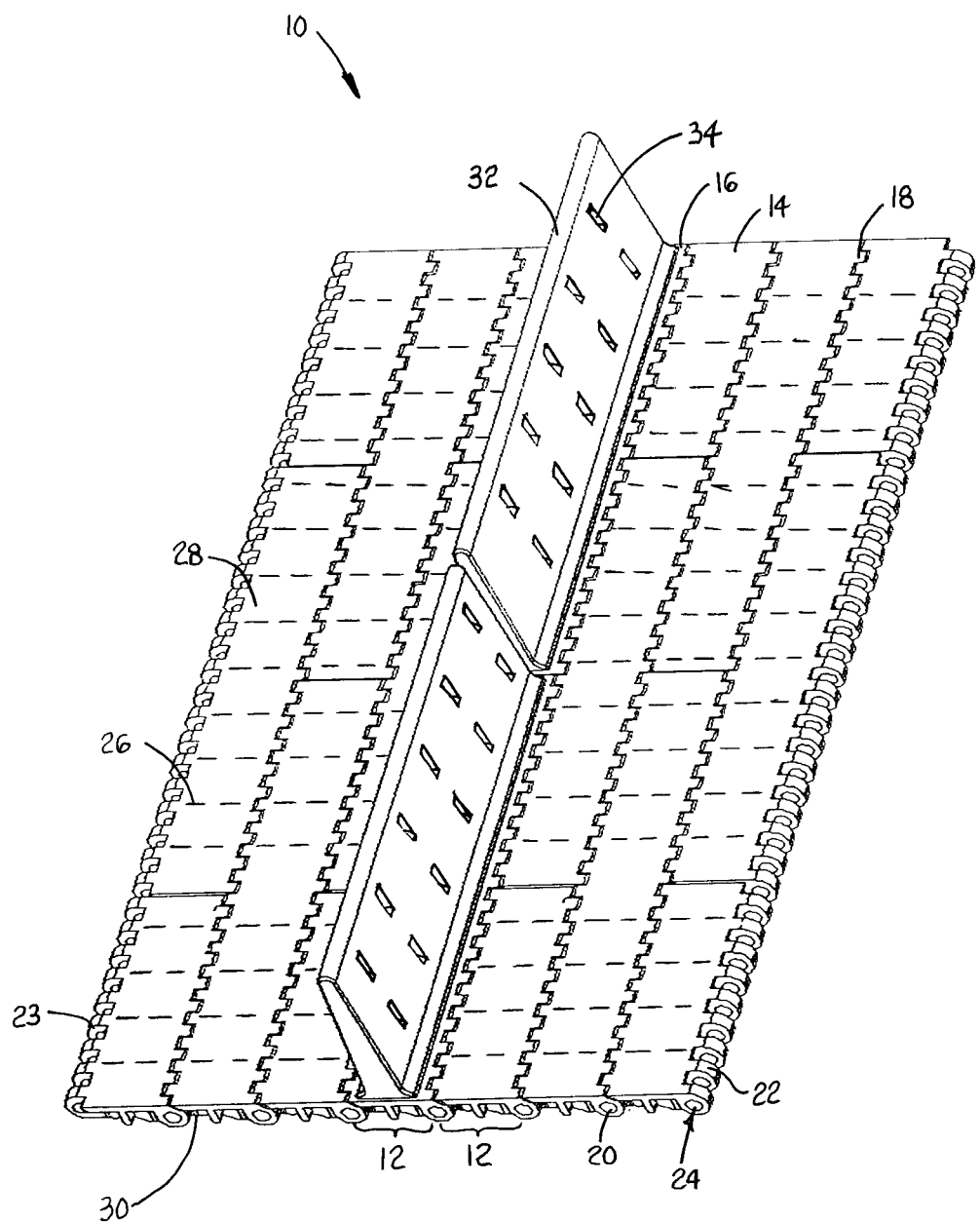
FIG. 1 is an oblique view of a portion of a conveyor belt embodying features of the invention.

A portion of a conveyor belt embodying features of the invention is shown in FIG. 1. The exemplary belt 10 is a modular plastic conveyor belt constructed of a plurality of rows 12 of one or more belt modules 14, 16 hingedly linked together at hinge joints 18 by hinge rods 20. Hinge elements 22, 23 at opposite ends of each row interleave with each other. Aligned holes 24 in the interleaved hinge elements receive the hinge rods. The plastic modules are conventionally injection-molded out of a thermoplastic polymer, such as acetal, polypropylene, polyethylene, nylon, or a composite polymer.

The conveyor belt is preferably a foraminous belt with perforations 26 extending through the thickness of the belt and opening onto the belt's outer conveying surface 28 and its opposite bottom side 30. The dimensions of the perforations are small enough to prevent individual bulk products conveyed atop the conveying surface from entering, and they are numerous enough to provide the belt with enough open area for process fluids to be forced into the conveyed products from below the belt.

In many cases, the process fluid that passes through the perforations alone is not sufficient to heat or cool the entire mass of products, except those products at and just above the conveying surface 28. This is especially true of thick and dense mats of products, such as peas and corn kernels. Some of the rows 12 of the belt 10 include modules 16 having hollow injectors 32 upstanding from the outer conveying surface 28 and advancing with the conveyor belt. In this example, the injectors are realized as flights that extend across the width of the module 16 and, together with one or more other such flighted modules in the row, across the entire width of the belt 10. But the flights could be segmented with gaps between them like the teeth of a comb and, whether segmented or continuous, need not extend across the entire width of the conveyor belt. The hollow injectors have output ports 34 through which the process fluid is injected into the bulk product layer conveyed on the belt. The output ports are shown, in this example, as narrow slits that are too small to admit individual products.

Figure 2:
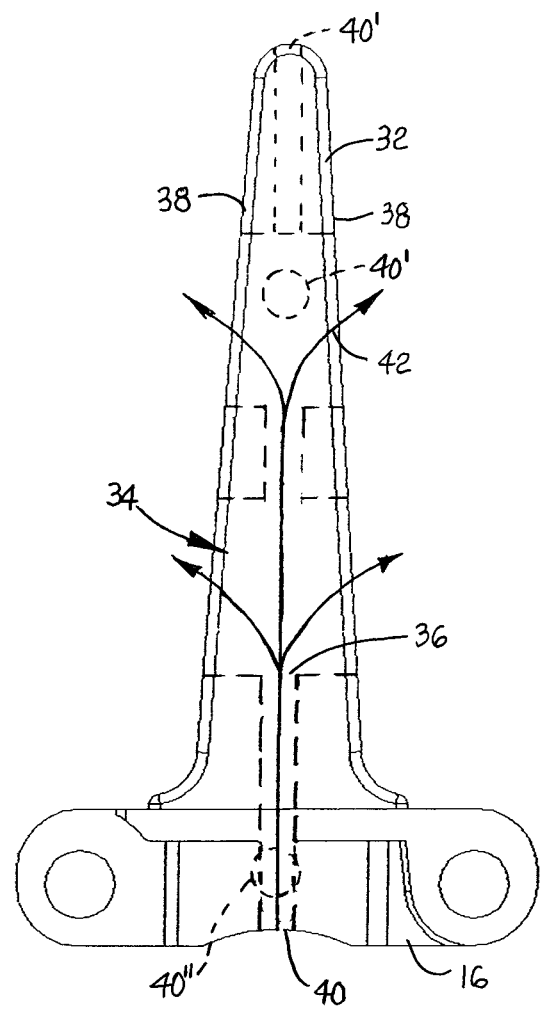
FIG. 2 is an enlarged side view of one module in the conveyor belt of FIG. 1.

As better shown in FIG. 2, the flight (or injector) 32 in this example is unitarily formed with the rest of the module 16 in the injection-molding process. A fluid channel 36 forms the hollow interior of the injector. The fluid channel opens onto the faces 38 of the injector through the output ports 34 and onto the bottom side 30 of the module 16 through an input port 40. But an input port could be located above the outer conveying surface, such as an input port 40' at the top of the flight or through the side, or between the bottom side and the top conveying surface, such as an input port 40" formed in the base. Process fluid forced through the input port 40 into the fluid channel 36 is injected into the conveyed product through the output ports 34, as indicated by flow arrows 42.

Figure 3:
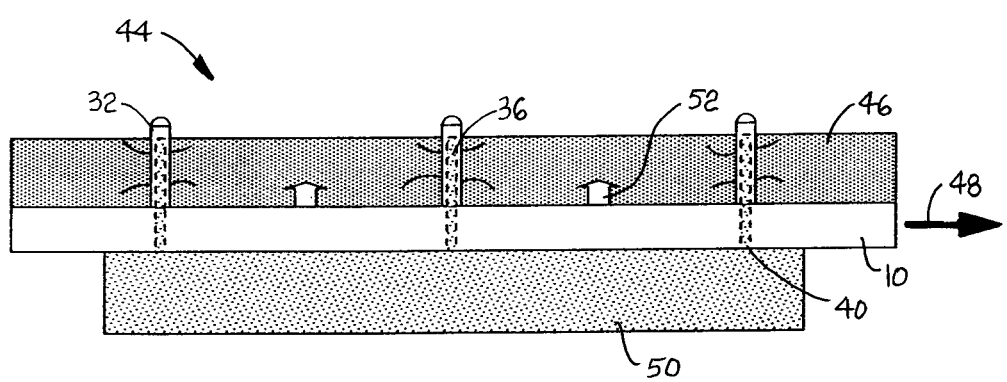
FIG. 3 is a side elevation view of a portion of a conveyor system embodying features of the invention and using a conveyor belt as in FIG. 1.

The conveyor belt 10 is shown in a belt conveyor 44 in FIG. 3. The conveyor belt advances a layer of bulk products 46 in a direction of belt travel 48 along the carryway. A source of process fluid 50, supplied from a plenum, for example, is in fluid communication with the input ports 40 of the fluid channels 36 in the hollow injectors 32. The pressurized source forces the process fluid into the hollow injectors, out through the output ports 34, and into the layer of bulk products 46 at levels above the outer conveying surface 28 of the belt. The product layer 46 is subjected to further treatment by the process fluid in the foraminous belt by the injection of process fluid through the perforations and into the bottom of the product mat, as indicated by arrows 52.

Figure 4:
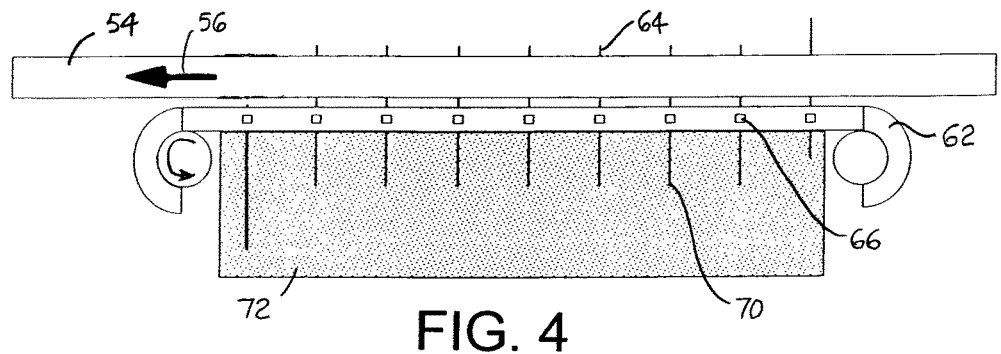
FIG. 4 is a side elevation view of another version of a conveyor system embodying features of the invention including a conveyor belt having openings with deflectable occluding members and a secondary belt having extendable injectors.
Figure 5:
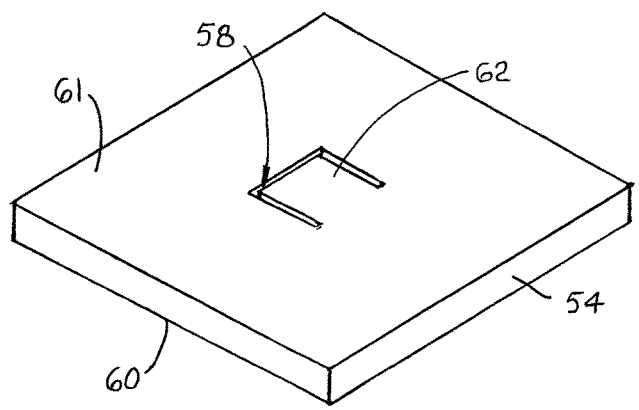
FIG. 5 is an isometric view of a portion of the outer conveying surface of a conveyor belt as in FIG. 4 showing an occluding member in a closed position.
Figure 6:
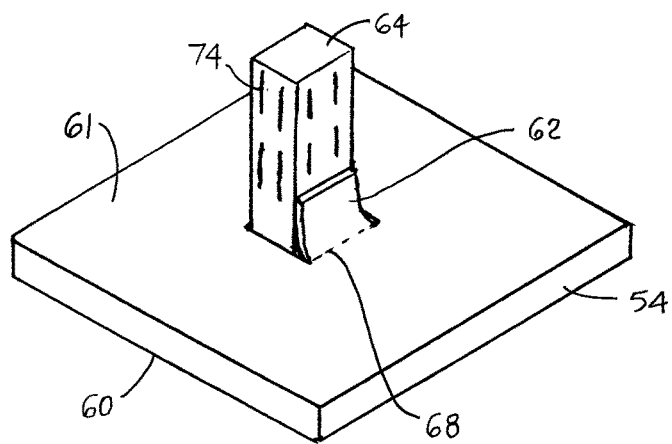
FIG. 6 is an isometric view of a portion of the outer conveying surface of a conveyor belt as in FIG. 4 showing an occluding member in an opened position.

Another version of a belt conveyor that can be used to inject a process fluid into a layer of bulk products is shown in FIG. 4. A conveyor belt 54 advances in a direction of belt travel 56. The conveyor belt is preferably a foraminous belt with perforations through its thickness. But, instead of hollow flights, the belt 54 has a plurality of openings 58—one of which is illustrated in FIGS. 5 and 6. The openings extend through the thickness of the belt 54 from the bottom side 60 to the outer conveying surface 61. As shown in FIG. 4, a secondary belt 62 carrying a plurality of height-adjustable hollow injectors 64 advances with the conveyor belt 54 under a portion of the conveyor belt's carryway path. The injectors are aligned with and extend through the openings 58 in the conveyor belt. Height-adjustment means 66 in the secondary belt 62 raise and lower the injectors 64 to a preferred level. As an injector is raised past the outer conveying surface 61 of the conveyor belt 54, it pushes the deflectable occluding member 62 aside, as shown in FIG. 6, into an open position. When the injector 64 is lowered below the outer conveying surface, the deflectable occluding member 62 returns to its closed position covering the opening 58 and preventing conveyed products from falling in. The occluding member may be realized as a flexible or resilient flap having a living hinge 68, as a pair of flaps, or as a hinged door, for example. The lower ends of the hollow injectors have input ports 70 through which a source of process fluid 72 supplies the process fluid to fluid channels in the injectors and into the conveyed product through output ports 74 in the upper ends of the injectors.

Figure 7:
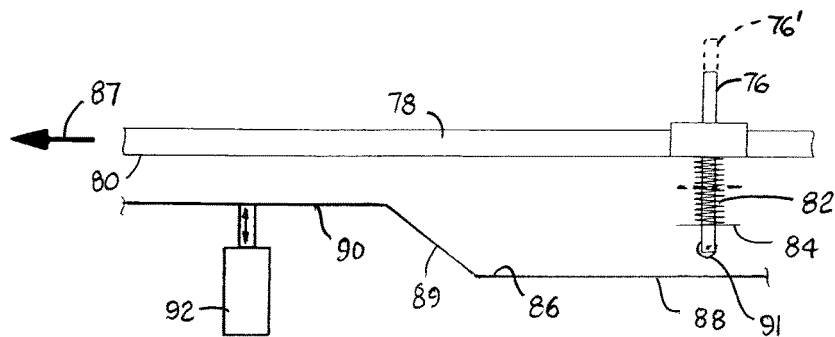
FIG. 7 is a side elevation view of a portion of a conveyor belt with a spring-loaded, adjustable-height injector usable in a conveyor system embodying features of the invention.

One version of height-adjustment means is shown in FIG. 7. The injector 76 extends upward from a belt 78, which could be a main conveyor belt (e.g., conveyor belt 10 in FIG. 3 or conveyor belt 54 in FIG. 4) or a secondary belt (e.g., belt 62 in FIG. 4). The injector 76 extends below the bottom side 80 of the belt. A coil spring 82 surrounds an upper portion of the injector below the belt. The spring is attached between the bottom side 80 of the belt and a spring seat 84 affixed to the injector. A bearing surface 86 in the belt carryway has a first portion 88 at a low level out of contact with the bottom end of the injector. This allows the injector 76 to retract to its lowest height under downward pressure from the spring. As the belt 78 advances in the direction of belt travel 87, a cam follower 91 at the bottom end of the injector rides up a ramp portion 89 of the bearing surface, which serves as a cam surface, to an upper horizontal portion 90. The injector 76 is forced upward to a height indicated by the dashed-line injector 76'. The maximum height of the injector may be adjusted by a linear actuator 92.

Figure 8:
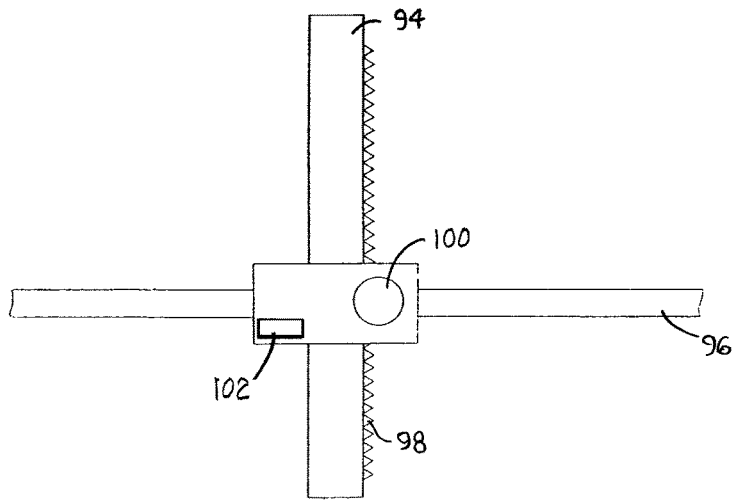
FIG. 8 is a side elevation view of a portion of a conveyor belt having a motor-driven, height-adjustable injector usable in a conveyor system embodying features of the invention.

Another version of height-adjustment means is shown in FIG. 8. In this version, the height of an injector 94 is controlled by height-adjustment means within a belt 96 rather than by externally mounted means. The hollow injector 94, which extends upward from the belt 96, has a set of gear teeth 98 along one side. The injector and gear teeth extend through the belt. A gear motor 100 rotates a pinion gear (not shown) that engages the rack of teeth to drive the injector up or down to a selected height above the belt. A nearby electronic module 102 powers and drives the motor.

Figure 9:
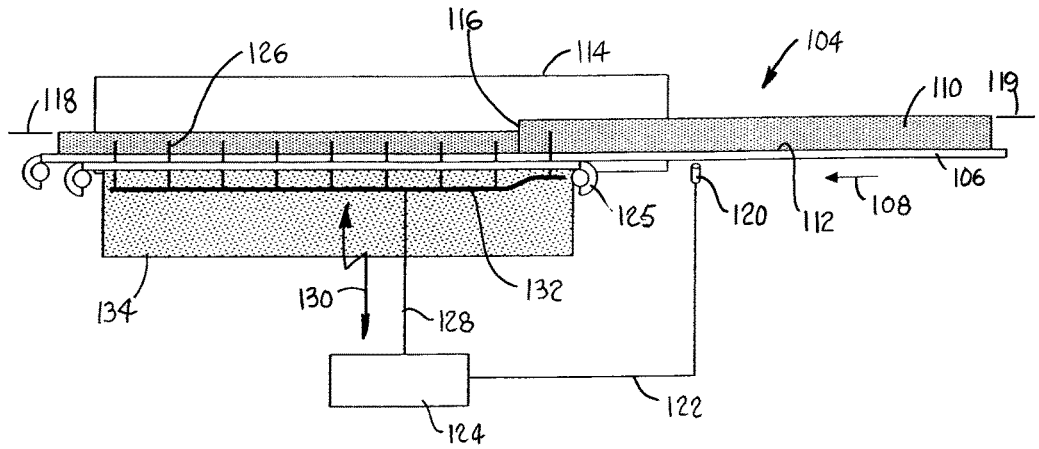
FIG. 9 is a partial block diagram, partial side elevation view of bulk products being conveyed through a processing device by a belt conveyor embodying features of the invention.

FIG. 9 shows a conveyor embodying features of the invention conveying a layer of bulk products through a process. The conveyor 104 includes a main conveyor belt 106 advancing in the direction of belt travel 108. The conveyor belt 106 supports a mat 110, or layer, of bulk products, such as vegetables, on an outer conveying surface 112 and conveys the product mat along an upper carryway through a processing station 114, such as a chiller, a freezer, a blancher, or a cooker. The product mat 110 shown has a step change in its depth at a position 116 along the carryway. In this example, the product mat has a shallower depth 118 downstream of the step position 116 and a greater depth 119 upstream. A product-depth sensor 120 near the entrance end of the processing station 114 measures the depth of the product mat by sensing its height or its weight, for example. For sensing height, a photo eye or other optical sensor, a proximity sensor, or a flapper with a rheostat, potentiometer, or angle encoder on its pivot shaft could be used. Alternative product-depth sensors include scales and weight sensors to weigh the product load and visioning systems to monitor product depth. The product-depth sensor 120 sends a load signal 122 to a controller 124, such as a programmable logic controller or other programmed control device.

The belt conveyor shown in FIG. 9, by way of example, is the one shown in FIG. 4, which uses a secondary belt 125 carrying injectors 126. From the load signal 122, the controller adjusts the heights of the injectors 126 over a control line 128 or a wireless link 130 to receivers in the secondary belt or external height-adjustment means 132. In the case of a belt-mounted height-adjustment means as in FIG. 8, a wireless radio link is preferable. The controller can also control the pressure or temperature of process fluid supplied by a source of process fluid 134. The process fluid may be hot air, hot water, or steam, for example, in a cooker or blancher; or it may be cold air or cold water in a chiller or freezer.

What is claimed is:

1. A conveyor comprising:
    a conveyor belt having a bottom side and an opposite outer conveying surface supporting a layer of bulk products and advancing the layer of bulk products in a direction of belt travel;
    a plurality of hollow injectors extending from the conveyor belt outward of the outer conveying surface into the layer of bulk products and having opposite front and rear faces, wherein the hollow injectors include interior fluid channels having input ports and having output ports opening onto the front and rear faces and into the layer of bulk products from more than one direction at one or more levels above the outer conveying surface;

a source of process fluid in fluid communication with the input ports to supply the process fluid through the fluid channels of the hollow injectors and the output ports and into the layer of bulk products in more than one direction and at the one or more levels above the outer conveying surface.

2. A conveyor as in claim 1 wherein the hollow injectors are unitarily formed with the outer conveying surface of the conveyor belt.

3. A conveyor as in claim 2 wherein the hollow injectors are flights extending across the belt along the outer conveying surface.

4. A conveyor as in claim 1 wherein the output ports comprise a plurality of narrow slits.

5. A conveyor as in claim 1 wherein the input ports are disposed at or below the bottom side of the conveyor belt.

6. A conveyor as in claim 1 wherein the input ports are disposed at or above the outer conveying surface.

7. A conveyor as in claim 1 wherein the input ports are disposed between the outer conveying surface and the bottom side of the conveyor belt.

8. A conveyor as in claim 1 wherein the process fluid is selected from the group consisting of hot air, hot water, steam, cold air, and cold water.

9. A conveyor comprising:
a conveyor belt having a bottom side and an opposite outer conveying surface supporting a layer of bulk products and advancing the layer of bulk products in a direction of belt travel;
a plurality of hollow injectors extending from the conveyor belt outward of the outer conveying surface into the layer of bulk products, wherein the hollow injectors include interior fluid channels having output ports opening into the layer of bulk products from more than one direction and input ports;
a source of process fluid in fluid communication with the input ports to supply the process fluid through the fluid channels of the hollow injectors and the output ports and into the layer of bulk products;
a second belt running in the direction of belt travel between the bottom side of the conveyor belt and the source of process fluid and wherein the conveyor belt includes a plurality of openings through the conveyor belt from the bottom side to the outer conveying surface and wherein the plurality of hollow injectors are disposed on the second belt in positions to extend through the openings in the conveyor belt and into the layer of bulk products.

10. A conveyor as in claim 9 wherein the conveyor belt includes a plurality of deflectable occluding members for the openings, wherein the hollow injectors received in the openings deflect the deflectable occluding members from a closed position preventing products from falling into the openings when the hollow injectors are absent to an open position admitting the hollow injectors through the openings and into the layer of bulk products.

11. A conveyor comprising:
a conveyor belt having a bottom side and an opposite outer conveying surface supporting a layer of bulk products and advancing the layer of bulk products in a direction of belt travel;
a plurality of hollow injectors extending from the conveyor belt outward of the outer conveying surface into the layer of bulk products, wherein the hollow injectors include interior fluid channels having output ports opening into the layer of bulk products from more than one direction and input ports;
a source of process fluid in fluid communication with the input ports to supply the process fluid through the fluid channels of the hollow injectors and the output ports and into the layer of bulk products;
height-adjustment means for adjusting the heights of the hollow injectors.

12. A conveyor as in claim 11 wherein the height-adjustment means includes motors embedded in the conveyor belt selectively actuated to raise and lower the hollow injectors to predetermined heights into the layer of bulk products.

13. A conveyor as in claim 11 wherein the height-adjustment means includes actuators proximate the conveyor belt to adjust the heights of the hollow injectors to predetermined heights within the layer of bulk products.

14. A conveyor as in claim 11 wherein the height-adjustment means includes a bearing surface below the conveyor belt and a cam follower coupled to the hollow injectors and riding on the bearing surface to adjust the heights of the hollow injectors above the outer conveying surface.

15. A conveyor as in claim 11 further comprising a product-depth sensor providing a load signal indicating the depth of the layer of bulk products and wherein the height-adjustment means adjusts the heights of the hollow injectors above the outer conveying surface as a function of the load signal.

16. A conveyor belt comprising:
a bottom side and an opposite outer conveying surface for supporting a layer of bulk products;
a plurality of hollow injectors having opposite front and rear faces extending from the conveyor belt outward from the outer conveying surface, wherein the hollow injectors include interior fluid channels having input ports and having output ports opening onto the front and rear faces of the hollow injectors outward of the outer conveying surface from more than one direction and at one or more levels above the outer conveying surface.

17. A conveyor belt as in claim 16 wherein the hollow injectors are flights unitarily formed with the outer conveying surface.

18. A conveyor belt as in claim 16 comprising a plurality of rows of one or more thermoplastic belt modules hingedly linked together.

19. A conveyor belt as in claim 16 wherein the output ports comprise a plurality of narrow slits.

20. A conveyor belt as in claim 16 wherein the input ports are disposed at or below the bottom side of the conveyor belt.

21. A conveyor belt as in claim 16 wherein the input ports are disposed at or above the outer conveying surface.

22. A conveyor belt as in claim 16 wherein the input ports are disposed between the outer conveying surface and the bottom side of the conveyor belt.

23. A method for injecting a process fluid into a layer of bulk products conveyed on a conveyor belt, comprising:
- conveying a layer of bulk products atop the outer conveying surface of a conveyor belt advancing in a direction of belt travel;
- advancing with the conveyor belt a plurality of hollow injectors extending from the conveyor belt outward from the outer conveying surface and having input ports in fluid communication with output ports positioned within the layer of bulk products and oriented in more than one direction;
- supplying a process fluid into the input ports and out through the output ports of the hollow injectors into the layer of bulk products;
- adjusting the heights of the hollow injectors above the outer conveying surface as the conveyor belt advances in the direction of belt travel.

24. The method of claim 23 comprising advancing the plurality of hollow injectors with a second belt advancing below the conveyor belt.

25. The method of claim 23 comprising supplying the process fluid into the input ports from below the conveyor belt.

* * * * *